United States Patent [19]

Odaka

[11] Patent Number: 4,598,403
[45] Date of Patent: Jul. 1, 1986

[54] ENCODING METHOD FOR ERROR CORRECTION

[75] Inventor: Kentaro Odaka, Kawasaki, Japan

[73] Assignee: Sony Corporation, Tokyo, Japan

[21] Appl. No.: 731,339

[22] PCT Filed: Apr. 16, 1982

[86] PCT No.: PCT/JP82/00125
§ 371 Date: Dec. 2, 1982
§ 102(e) Date: Dec. 2, 1982

[87] PCT Pub. No.: WO82/03719
PCT Pub. Date: Oct. 28, 1982

Related U.S. Application Data

[63] Continuation of Ser. No. 451,157, Dec. 2, 1982, abandoned.

[30] Foreign Application Priority Data

Apr. 16, 1981 [JP] Japan ............................. 56-57630
Feb. 23, 1982 [JP] Japan ............................. 57-45859

[51] Int. Cl.⁴ ............................................. G06F 11/10
[52] U.S. Cl. ........................................ 371/39; 371/40
[58] Field of Search .......................... 371/38, 39, 40

[56] References Cited

U.S. PATENT DOCUMENTS

| 4,312,070 | 1/1982 | Coombes et al. | 371/40 |
| 4,336,612 | 6/1982 | Inoue et al. | 371/39 |
| 4,398,292 | 8/1983 | Doi et al. | 371/39 |
| 4,413,340 | 11/1983 | Odaka et al. | 371/39 |

FOREIGN PATENT DOCUMENTS

| 115753 | 5/1980 | Japan . | |
| 145451 | 11/1980 | Japan . | |
| 2038144 | 7/1980 | United Kingdom | 371/39 |

Primary Examiner—Charles E. Atkinson
Attorney, Agent, or Firm—Lewis H. Eslinger; Alvin Sinderbrand

[57] ABSTRACT

An encoding method for error correction is disclosed which employs a so-called cross-interleave where a first redundant code is generated from a PCM word and these redundant code and PCM word are subjected to interleave process to thereby generate a second redundant code. In this case, the interleave is restricted to making a rearrangement of words within a predetermined one interleave block and the decoding is completed at one interleave block with the result that edition is simplified. Moreover, the second redundant code is included in the first redundant code generation sequence to improve error correction ability. If, now, a signal of control information is selected as an initial value of the second redundant code, a transmission area, an encoder and a decoder peculiar to the control information can be omitted.

10 Claims, 7 Drawing Figures

FIG. 5

BLOCK ADDRESS (m) →

|   | 0 | 1 | 2 | 3 | -------- | 172 | 173 | 174 |
|---|---|---|---|---|---|---|---|---|
| Q (6) | $Q_0$ | $Q_1$ | $Q_2$ | $Q_3$ | | $Q_{172}$ | $Q_{173}$ | $Q_{174}$ |
| P (7) | $P_0$ | $P_1$ | $P_2$ | $P_3$ | | $P_{172}$ | $P_{173}$ | $P_{174}$ |
| PCM DATA (0) | $W_{(0,0)}$ | $W_{(1,0)}$ | | | | | | |
| (1) | $W_{(0,1)}$ | $W_{(1,1)}$ | | | | | | |
| (2) | $W_{(0,2)}$ | $W_{(1,2)}$ | | | | | | |
| (3) | $W_{(0,3)}$ | $W_{(1,3)}$ | | | | | | |
| (4) | $W_{(0,4)}$ | $W_{(1,4)}$ | | | | | | |
| (5) | $W_{(0,5)}$ | $W_{(1,5)}$ | | | | | | |

WORD ADDRESS (n)

FIG. 7

BLOCK ADDRESS (m) →

|   | 0 | 1 | 2 | 3 | -------- | 147 | 148 | 149 |
|---|---|---|---|---|---|---|---|---|
| Q (7) | $Q_0$ | $Q_1$ | $Q_2$ | $Q_3$ | | $Q_{147}$ | $Q_{148}$ | $Q_{149}$ |
| P (8) | $P_0$ | $P_1$ | $P_2$ | $P_3$ | | $P_{147}$ | $P_{148}$ | $P_{149}$ |
| PCM DATA (0) | $W_{(0,0)}$ | $W_{(1,0)}$ | | | | | | |
| (1) | $W_{(0,1)}$ | $W_{(1,1)}$ | | | | | | |
| (2) | $W_{(0,2)}$ | $W_{(1,2)}$ | | | | | | |
| (3) | $W_{(0,3)}$ | $W_{(1,3)}$ | | | | | | |
| (4) | $W_{(0,4)}$ | $W_{(1,4)}$ | | | | | | |
| (5) | $W_{(0,5)}$ | $W_{(1,5)}$ | | | | | | |
| (6) | $W_{(0,6)}$ | $W_{(1,6)}$ | | | | | | |

WORD ADDRESS (n)

ENCODING METHOD FOR ERROR CORRECTION

This is a continuation of application Ser. No. 451,157, filed 12-2-82, now abandoned.

DESCRIPTION

1. Technical Field

This invention relates to an encoding method for error correction which employs a feedback type cross-interleave.

2. Background Art

In the prior art, it is known that an audio signal sequence, for example, can be sampled at every sample (word) of a predetermined number, an error correction redundant code can be added thereto, an interleave operation can be performed to delay PCM data of the predetermined numbered sample (word) and error correction code with respectively different delay amounts and an error detection code can be added thereto, and the so modified audio signal sequence recorded and reproduced. As one of such interleaves, there has been proposed a cross-interleave technique in which a first redundant code is added to PCM words of the predetermined number which are in a first arrangement state, a second redundant code is added to the PCM words of the predetermined number which are put into a second arrangement state after the interleave operation, and a third redundant code is added to the PCM words of the predetermined number which are put into a third arrangement state after the interleave operation and after the first and second redundant codes have been added. In the cross-interleave technique, since each word of the PCM data is included in two sequences which respectively generate the first redundant code and the second redundant code, it can improve error correction ability as compared with ordinary interleave. In accordance with a feedback-type cross-interleave, the second redundant code is fed back to the first arrangement state so as to include the second redundant code in the sequence which generates the first redundant code so that the error correction ability thereof can be improved much more.

FIG. 1 shows an arrangement of a block completion type encoder 1 for a non-feedback type cross-interleave, where PCM data such as audio PCM data and the like are divided into one interleave block (of n words×m blocks). In the representation of W(m, n), m denotes a block number included within an interleave block, while n denotes a word number included within the interleave block. From data of respective blocks within the interleave block is formed a first parity data Pm by a modulus-2 (mod. 2) adder 2.

$$Pm = \sum_{k=0}^{n-1} W(m, k)$$

Next, a memory circuit 3 carries out interleave processing. The memory circuit 3 has a capacity large enough to memorize the data of one interleave block and operates to delay respective words of W(m, 0), W(m, 1) ... W(m, n−1), Pm by d blocks each. PCM data and parity data which were put into the second arrangement state by this delay processing are supplied to a modulus-2 (mod. 2) adder 4 which forms a second parity data Qm.

$$Qm = \sum_{k=0}^{n-1} W(m - kd, k) + Pm - nd$$

where the block numbers m−kd and m−nd are calculated by (mod. m) and completed at each one interleave block.

FIG. 2 illustrates such block completion type-cross-interleave where a line in the vertical direction in the figure represents a data sequence which generates the first parity Pm, while a line in the oblique direction represents a data sequence which generates the second parity Qm. As shown in the states of broken lines in FIG. 2, the block numbers of the data which generate the second parity Qm are calculated by (mod. m) so that the block numbers may sometimes be returned to smaller numbers. For this reason, the memory circuit with the capacity of one interleave block amount must be required. All PCM words within one interleave block are contained in two parity generation sequences, and these two parity generation sequences are made different at every words within one interleave block.

There is further provided a memory circuit 5 which delays n PCM data sequences and two parity data sequences by 0, (D−d), 2(D−d) ... , n(D−d), (n+1)(D−d) blocks. In the case of this delay, the block number is calculated by (mod. m), too. Data of (n+2) words extracted from the respective data sequences which were delayed by the memory circuit 5 are supplied to a CRC generator 6 which forms a CRC code. The CRC code is used for error-detection with respect to (n+2) words.

The outputs from the aforesaid encoder are recorded by a stationary head as tracks in the longitudinal direction of a magnetic tape at every data sequence or converted to a serial data sequence and then recorded by a rotary head as one track on the magnetic tape. When the data sequences are recorded on the magnetic head, each of the interleave blocks is completed block-by-block, so that the recorded position is made different at each interleave block thus an edition per interleave block unit is made easy.

The data which were subjected to the error-correction encoding as described above are reproduced from the magnetic tape and first, the existence of error is checked by the CRC code. Next, they are de-interleaved so as to cancel the delays thereof given by the memory circuit 5 and then error-detection and error-correction are carried out by using the second parity Q. Furthermore, they are de-interleaved so as to cancel the delays thereof given by the memory circuit 3 and then error-detection and error-correction are carried out by using the first parity P. These de-interleave processings are also performed by interleave block unit.

As described above, if the interleave block completion type is employed, a simple editing operation can be made easily. But, since the aforesaid code arrangement is based on the non-feedback type cross-interleave, the first parity P does not contain the second parity Q in the generation sequences, so error-correction ability is not sufficient. One object of this invention is to provide an encoding method for error correction which is based on not only the feedback type cross-interleave but also a block completion type.

When digital data such as audio PCM signal and so on are recorded and reproduced by, for example, a rotary head-type tape recorder, a control information indicative of kinds, purpose and the like of the recorded signal is added frequently. As the control information, there are utilized the following ones; a control signal for identifying whether the audio signal is for stereophonic broadcasting or bilingual broadcasting; a control signal for identifying whether or not preemphasis is made effective; a control signal identifying whether a noise reduction processing is made or not and if so the kind thereof; a control signal for indicating how many times the audio channel is rewritten; and a control signal containing an information for musical selection or for display.

In the prior art, besides the main digital data, the control signal is independently inserted and since it is relatively important, this control signal is subjected to the individual error-correction encoding. Accordingly, a special transmission area must be provided in addition to that of the main data and the individual error-correction encoder and decoder are also required for the control signal, so that this leads to a problem that the arrangement thereof becomes complicated.

This invention is to solve such a problem too.

DISCLOSURE OF INVENTION

In accordance with this invention, the feedback type cross-interleave code which has high error-detection and error-correction ability is employed and sets of the encoded words of the predetermined number are completed at every block so that when a transmission data to which this invention was applied is recorded on the magnetic tape, editing on a per block unit basis can easily be performed and the error-correction ability can be improved.

Moreover, in this invention, if an initial value of redundant code for error correction is selected to be the control signal, a special transmission area does not have to be provided for this control signal, and an encoder and a decoder for the control signal does not have to be provided, too.

BRIEF DESCRIPTION OF DRAWINGS

FIG. 5 is a schematic diagram showing sets of data within one interleave block according to an embodiment of this invention, FIG. 7 is a schematic diagram showing sets of data within one interleave block according to another embodiment of this invention.

BEST MODE FOR CARRYING OUT THE INVENTION

Figure 1:
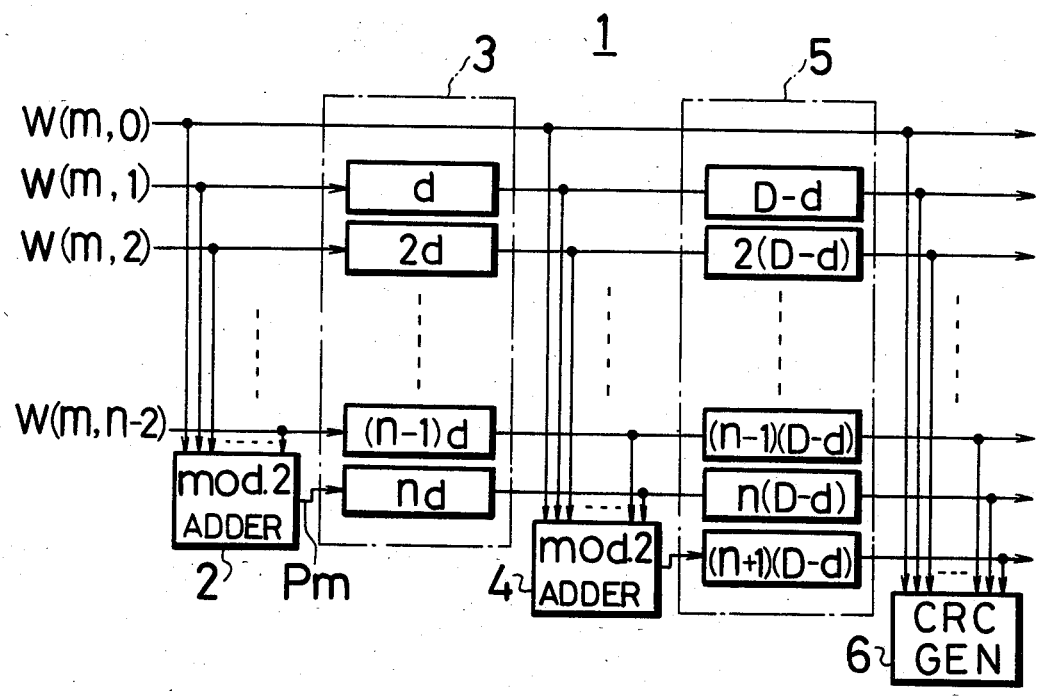
FIGS. 1 and 2 are schematic diagrams showing an example of an encoder for error correction codes employing a cross-interleave and a relation between data which are used to explain this invention, by way of example.
Figure 2:
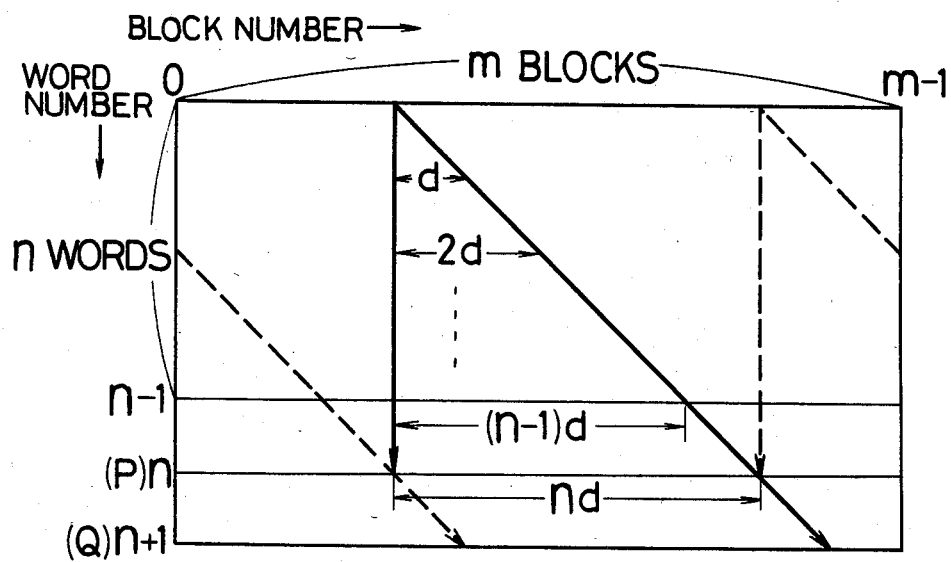
Figure 3:
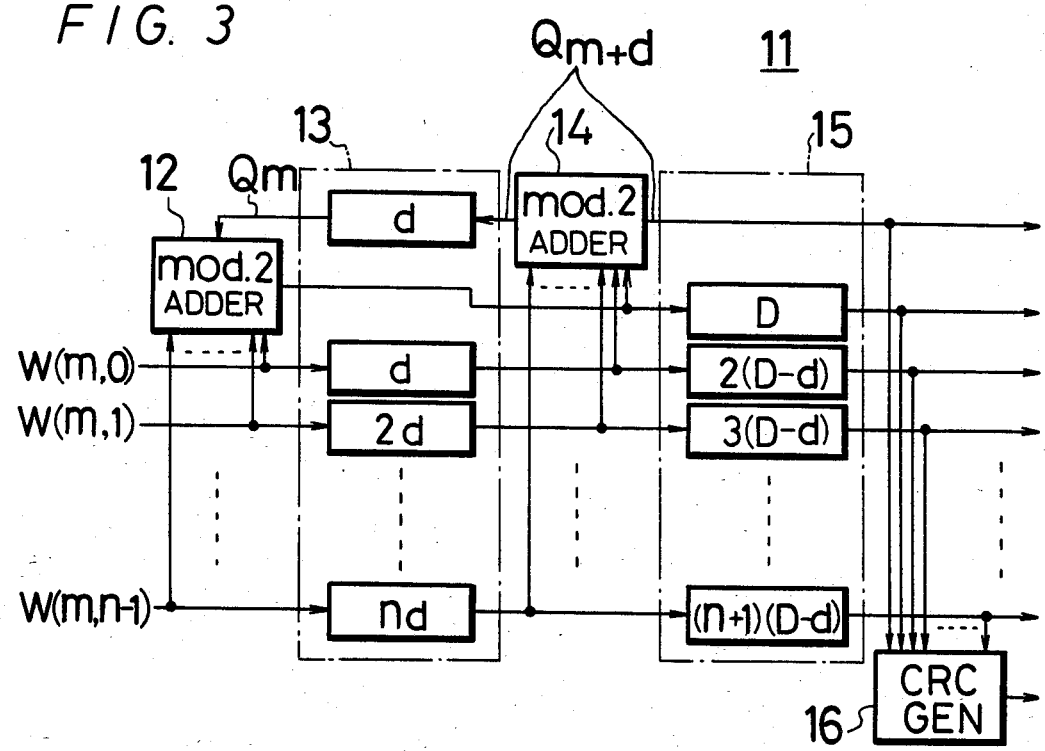
FIGS. 3 and 4 are schematic diagrams showing an encoder and a relation between data which are used to explain this invention.

Hereinafter, this invention will be described with reference to FIGS. 3 and 4. FIG. 3 illustrates an encoder 11 according to this invention. In this figure, a set of (n words×m blocks) of PCM data is made to form one interleave block. A (mod. 2) adder 12 generates the first parity Pm and the interleave is carried out by a memory 13. Another (mod. 2) adder 14 generates the second parity Qm (Qm+D) and further interleave is performed by a memory 15. Following such interleave operation, (n+2) words are transmitted to a CRC generator 16 which generates a CRC code.

In this case, the encoder 11 is formed as the feedback type so that the first parity P is generated to contain the second parity Q.

$$Pm \oplus Qm = \sum_{k=0}^{n-1} W(m, k)$$

The second parity Q is generated to contain the first parity P.

$$Pm \oplus Qm + d = \sum_{k=0}^{n-1} W(m - (k + 1)d, k)$$

where the block number thereof is calculated by (mod. m). Above two equations determine the cross-interleave condition.

$$\therefore Qm \oplus Qm + d = \sum_{k=0}^{n-1} \{W(m, k) \oplus W(m - (k + 1)d, k)\}$$

That is, $(Qm \oplus Qm+d)$ is independently decided regardless of Pm. Similarly, as seen in $$Pm \oplus Pm + d = \sum_{k=0}^{n-1} \{W(m + d, k) \oplus W(m - (k + 1)d, k)\}$$

$(Pm \oplus Pm+d)$ is independently decided regardless of Qm.

In other words, parity data sequences $$\left\{ \begin{array}{l} Pm, Pm + d, \ldots, Pm + ld, \ldots \\ Qm, Qm + d, \ldots, Qm + ld, \ldots \end{array} \right\} \text{ are defined by a difference}$$

between respective terms and the relation between Pm and Qm is defined by the cross-interleave condition. Therefore, putting an initial value into a certain term determines a value of each term.

In the cross-interleave condition as mentioned hereinbefore $$\begin{cases} Pm \oplus Qm = \sum_{k=0}^{n-1} W(m, k) \\ Pm \oplus Qm + d = \sum_{k=0}^{n-1} W(m - (k + 1)d, k) \end{cases}$$

if an initial value $Q_0$ is taken as, for example, "0", the respective parities are determined word by word in turn as follows.

$$P_0 = \sum_{k=0}^{n-1} W(0, k)$$

$$Q_{0+d} = P_0 \oplus \sum_{k=0}^{n-1} W(0 - (k + 1)d, k)$$

$$P_{0+d} = Q_{0+d} \oplus \sum_{k=0}^{n-1} W(0 + d, k)$$

$$Qld = P_{(l-1)d} \oplus \sum_{k=0}^{n-1} W((l-1)d - (k+1)d, k)$$

$$Pld = Qld \oplus \sum_{k=0}^{n-1} W(ld, k)$$

where since the encoding is the block completion type, the block number is (mod. m) and ld (block number) which satisfies the conditon of ld (mod. m)=0 exists. At this time, it is sufficient that $Qld=Q_0$, $Pld=P_0$ are established. Proof for this is carried out as follows.

$$Qld = \sum_{i=0}^{l-1}\sum_{k=0}^{n-1} W(id, k) \oplus \sum_{i=0}^{l-1}\sum_{k=0}^{n-1} W(id - (k+1)d, k)$$

$$= \sum_{k=0}^{n-1}\left(\sum_{i=0}^{l-1} W(id, k) \oplus W(id - (k+1)d, k)\right)$$

where since $i=0\sim(l-1)$ is established, both of id and $id-(k+1)d$ contain the same block number each time without failure. Thus $Qld=Q_0=0$ is established. Moreover, since ld=0, $$Pld = Q_0 \oplus \sum_{k=0}^{n-1} W(ld, k)$$

$$= Q_0 \oplus \sum_{k=0}^{n-1} W(0, k) = P_0$$

is obtained.

Figure 4:
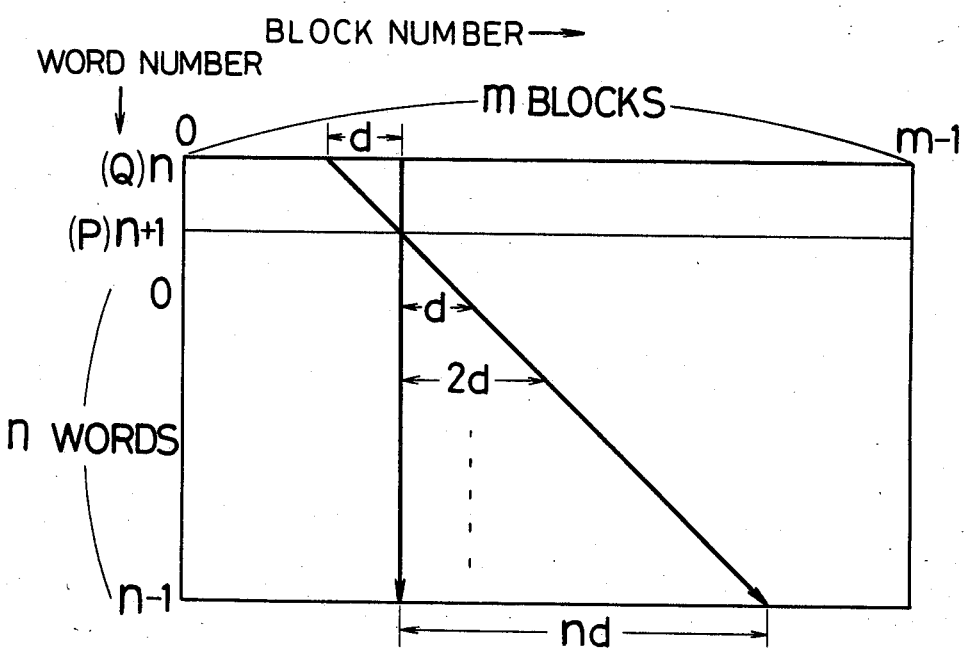

FIG. 4 illustrates the relation between data in the feedback type cross-interleave where (n words×m blocks) form one interleave block.

As described above, in the feedback type cross-interleave, two parities Pm and Qm are decided in turn with an interval of d block each. Accordingly, when the unit delay amount d and the block number m of one interleave block are prime numbers with each other, md=0 (mod. m) is satisfied so that Pm and Qm of m numbers are respectively decided.

While in the aforesaid description, the initial value $Q_0$ is taken as "0" for simplicity, any arbitrary one can be used for this initial value $Q_0$. Therefore, in this invention, a code representative of the afore-described control information may be utilized as the initial value $Q_0$. In this case, the initial value of one word not only corresponds to one word of the control signal but also one unit of the control signal may be comprised of initial values of plural words existing respectively in a plurality of successive interleave blocks.

When d and m are not prime numbers with respect to each other, namely, $m=a\times m'$ and $d=a\times d'$ (m'd=0 (mod.m)) are established, only m' parities are decided. However, at this time, it is sufficient that the feedback type cross-interleave of sequences of a numbers will be made by determining a initial values of a numbers.

Furthermore, the encoding is not limited to the linear feedback type cross-interleave where word sequences for respectively generating two parities are spaced apart with a distance of an integer multiple times as long as the unit delay amount d, but the encoding may be arranged as a nonlinear feedback type cross-interleave where the distance between the word sequences for respectively generating two parities is not regular.

Hereinafter, an embodiment of this invention will be described with reference to FIGS. 5 and 6. This embodiment is the case of the nonlinear feedback type cross-interleave.

As shown in FIG. 5, one interleave block is formed of $175\times 6=1050$ words where m=0 to 174 and n=0 to 5 are satisfied.

Then, two parities Pm and Qm are decided as follows.

$Qm = Pm + 18 \oplus W(m+36, 0) \oplus W(m+54,$
$1) \oplus W(m+72, 2) \oplus \oplus W(m+90, 3) \oplus W(m+108,$
$4) \oplus W(m+126, 5)$ $Pm + 18 = Qm + 1 \oplus W(m + 29, 0) \oplus W(m + 35, 1) \oplus$ $W(m + 51, 2) \oplus W(m + 66, 3) \oplus W(m + 78, 4) \oplus W(m + 92, 5)$ As the initial value $Q_0$, there is employed a control data which was written in a corresponding address in a memory. Two parities expressed by the above equations are formed such that, first, all PCM data within one interleave block are written in a RAM (random access memory), and the block number (block address) m is sequentially varied from 0 to 174 to generate the block address, which satisfies the cross-interleave condition on the above equations, in association with the word number n (word address) whereby to read the PCM data in the above equations in turn. Then, the parities formed so far are again written in the corresponding addresses in the RAM. Meanwhile, when it is desired to form the CRC code, the parity data and the PCM data are read out from the RAM to generate the CRC code.

Figure 6:
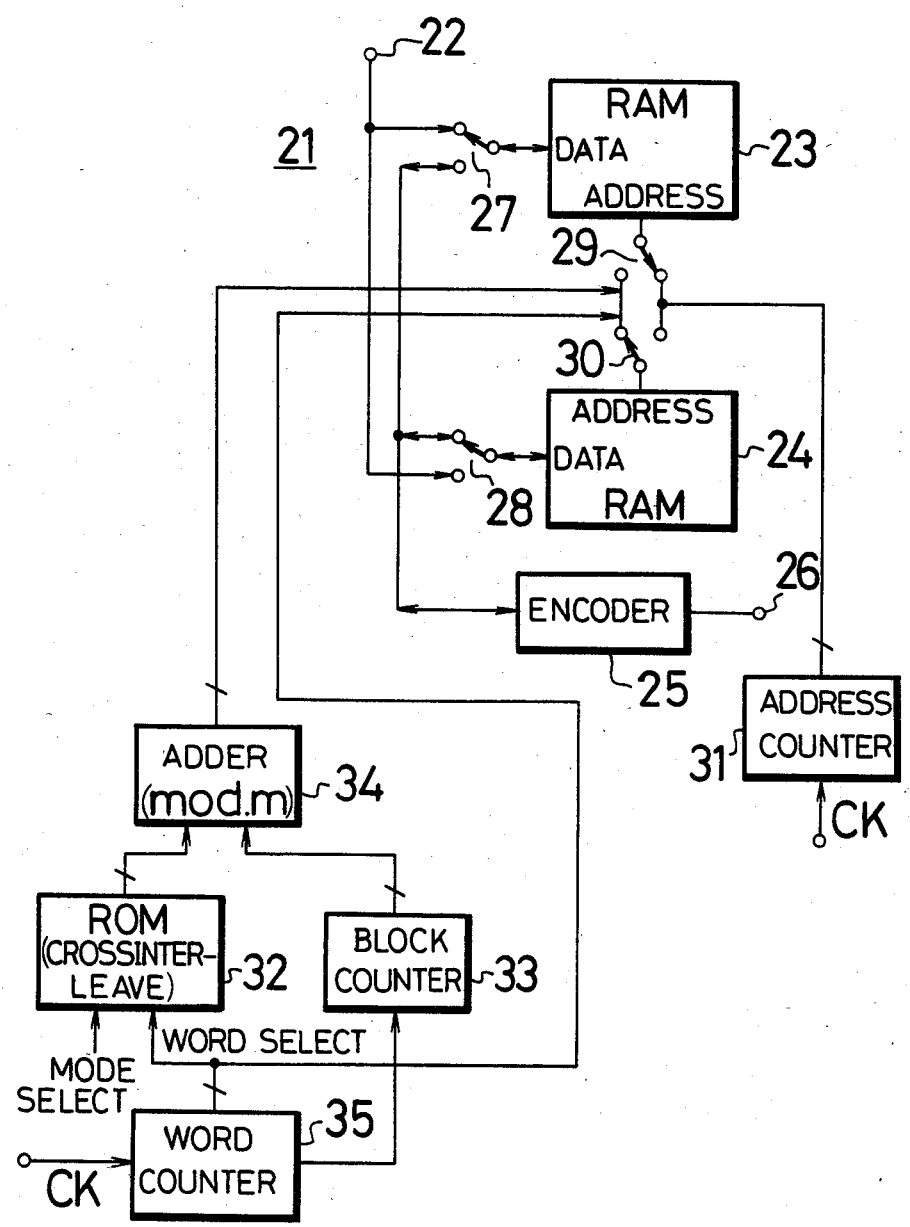
FIG. 6 is a block diagram showing an arrangement of an encoder according to an embodiment of this invention.

FIG. 6 shows an arrangement of an encoder 21 in the embodiment as described above. In the Figure, to an input terminal denoted by reference numeral 22 is supplied PCM data whose one word is 8 bits. Reference numerals 23 and 24 respectively designate RAMs, the capacity of each of which is $(8\times 175)$ words or above, for example, $8\times 2K$ bits. One of the RAMs 23 and 24 increments its block address and word address to latch therein the PCM data fed from the input terminal 22, while the address of the other is controlled so as to satisfy the cross-interleave condition whereby the PCM data written therein at the foregoing operation cycle are delivered and two parity data, for example, formed by an encoder 25 are latched therein. To the PCM data and the parity data read out from one of the RAMs 23 and 24 is added a CRC code generated from a CRC generator within an encoder 25, which is then delivered to an output terminal 26. In this embodiment, to the PCM data of 6 words and the parities of 2 words at every block is added the CRC code of 16 bits. The RAMs 23 and 24 are provided with data selectors 27 and 28 for changing over data and address selectors 29 and 30 for changing over addresses.

An address counter 31 to which a word clock CK is supplied forms a block address which increments from 0 to 174 and a word address which increments from 0 to 5 in each of the block addresses. In the illustrated example, to the RAM 23 are supplied these addresses so that the PCM data are written in the RAM 23.

Moreover, when two parity data are formed, as indicated by the foregoing expression, using the initial value, for example, $Q_0$, two parities, each of which is 175 pieces, are determined in turn as in $P_{18}\rightarrow Q_1\rightarrow P_{19}\rightarrow Q_2\rightarrow P_{20}\rightarrow Q_3\rightarrow P_{21}\ldots$ The respective parities are written in corresponding addresses of either of the RAMs 23 and 24. The block address for performing such cross-interleave is formed by a ROM 32, (a mod. 175), namely, 175-scale block counter 33 and a (mod. 175) adder 34, while the word address is formed by an 8-scale word counter 35 to which the word clock CK is supplied. Of address codes of 11 bits which will be supplied to the RAMs 23 and 24, upper 8 bits are assigned to the block address and lower 3 bits are assigned to the word address.

The carry output from the word counter 35 is supplied to the block counter 33 in the ratio of 2:1 and the word address is supplied to the ROM 32. In the parities $Q_m$ and $P_m$ represented by the foregoing expressions, first an $m=0$ output is generated from the block counter 33, and at the same time, a mode select for generating the parity $P_m$ is supplied to the ROM 32. Then, when the word address generated from the word counter 35 increments from 0 to 7, from the ROM 32, are in synchronism therewith and the block addresses of 36, 54, 72, 90, 108, 126 and 18 are generated in this order and then supplied to either of the RAMs 23 and 24 (the RAM 24 in the illustrated example) by way of the adder 34. Thus, PCM data of totally 6 words of $W(36, 0)$, $W(54, 1)$ ... $W(126, 5)$ are read out from the RAM 24, the parity $P_{18}$ is formed in the encoder 25 and this parity $P_{18}$ is written in the corresponding address of the RAM 24. This parity $P_{18}$ is preserved in a register incorporated within the encoder 25.

Next, the mode select to be supplied to the ROM 32 is switched to the mode select which allows the parity $Q_m$ to be formed. In this state, the output from the block counter 33 is still zero. Then, in synchronism with the word address being changed, the block addresses are generated in the order of 29, 35, 51, 66, 78, 92 and 1, which are then supplied to the RAM 24 by way of the adder 34. Thus the PCM data words of totally 6 words of $W(29, 0)$, $W(35, 1)$, ... $W(92, 5)$ are read out from the RAM 24 and the parity $Q_1$ is formed in the encoder 25 in the operation of $Q_1 = P_{18} \oplus W(29, 0) \oplus \ldots \oplus W(92, 5)$ and this parity $Q_1$ is written in the corresponding address.

Next, the block counter 33 is incremented by one scale by the carry output from the word counter 35 so as to be $m=1$. In this state, in like operation as described above, first, the parity $P_{19}$ is formed and then the parity $Q_2$ is formed. Further, at each stage of $m=2, m=3, \ldots m=174$, the aforesaid operation is repeated to determine all the parities.

The PCM data and the parities of one interleave block are read out in turn from the RAM 24, the CRC codes which will be added to data of every blocks are formed in the encoder 25, and the transmission data to which the CRC codes were added are delivered to the output terminal 26. In the next operation cycle, the operations of the RAM 23 and the RAM 24 are replaced with each other and the similar operations are carried out again.

The decoder for decoding the encoded transmission data as described above is not shown but performs the address control thereof similarly as in the case of the encoder, where in the decoder, first of all, the CRC check is conducted, the result thereof is made one bit and then this one bit is written together with data in the RAM for the de-interleave.

FIG. 7 is a diagram used to explain another embodiment of this invention being applied to the nonlinear feedback type cross-interleave. As shown in the figure, one interleave block is formed of $7 \times 150$ words and two parities are formed on the basis of the following expressions.

$$Q_m = P_m + 16 \oplus W(m+32, 0) \oplus W(m+48, 1) \oplus W(m+64, 2) \oplus W(m+80, 3) \oplus W(m+96, 4) \oplus W(m+112, 5) \oplus W(m+128, 6)$$

$$P_m + 16 = Q_m + 2 \oplus W(m+24, 0) \oplus W(m+26, 1) \oplus W(m+42, 2) \oplus W(m+54, 3) \oplus W(m+62, 4) + W(m+72, 5) \oplus W(m+86, 6)$$

A method of how to form these parities is that first, the initial value $Q_0$ is employed to determine the parities of even-numbered block numbers as in $P_{16} \rightarrow Q_2 \rightarrow P_{18} \rightarrow Q_4 \ldots$ Next, the parities of odd-numbered block numbers are determined by using the initial value $Q_1$ as in $P_{17} \rightarrow Q_3 \rightarrow P_{19} \rightarrow Q_5 \ldots$ That is, in another embodiment of this invention, there exist two cross-interleave sequences and at this time, the control signals can be used as the initial values $Q_0$ and $Q_1$.

According to the above embodiment of this invention, the feedback type cross-interleave is employed so that the correction ability can be improved. Besides, the sets of the encoded words of the predetermined number are completed at every block so that when the transmission data is recorded on the magnetic tape, edition per block unit can easily be performed.

Moreover, since in the aforesaid embodiments, the control signals are used as the initial values $Q_0$ ($Q_0$ and $Q_1$), there is then the effect in practice that the transmission area for the control signal and the error correction encoder and decoder for the control signal are not required.

Furthermore, while in the aforesaid embodiments, the parities are employed as the error detection and correction codes, it may be possible to use error detection and correction codes other than the above such as BCH code and so on. In addition, it may be also possible that the write address used when the PCM data are written in the RAM is controlled to rearrange the arrangement state of the data within one interleave block different from the original order thus the interpolation and the like being made easy.

I claim:

1. An encoding method for error correction comprising the steps of:
   arranging consecutive PCM data into a block having ($m \times n$) word units;
   selecting a first error correction redundant code from control signals to form an initial first error correcting code;
   interleaving said data and said initial first error correction code to form a first interleaved block;
   generating a second different error correction redundant code from said first interleaved block and including each word in said block;
   feeding back said second error correction redundant code and generating a subsequent first error correction redundant code using said block and said second error correction redundant code in which said subsequent first error correction redundant code includes each word of said second error correction redundant code;
   interleaving said first interleaved block and said first error correction redundant code to form a second interleaved block; and
   transmitting said second interleaved block and said second error correction redundant code.

2. A method according to claim 1, in which said transmitted data is recorded on a magnetic tape and including the further step of completing each block of data before it is recorded.

3. Apparatus for providing error correction for serial digital data, comprising:

first and second random access memory means connected to selectively receive said serial digital data for retaining said data as words therein;

encoder means for forming parity data and a cyclic recirculating check code based on said serial digital data and being fed to said first and second random access memory means;

data selector means receiving said serial digital data and said parity data and connected to said first and second random access memory means and being controllable to feed said data and said parity data to one or the other of said first and second random access memory means;

address selector means connected to said first and second random access memory means for selectively connecting address signals to alternate ones of said first and second random access memory means; and means for producing data word addresses and parity word addresses fed to said address selector means for outputting from said first and second random access memory means interleaved data and parity data for trasmission.

4. Apparatus for providing error correction according to claim 3, in which said encoder means further produces a cyclic redundancy check code from said serial digital data and said cyclic recirculating check code is added to said output data and parity words prior to said transmission thereof.

5. Apparatus for providing error correction according to claim 3, further comprising address counter means receiving an external clock signal and producing address control signals fed to said address selector means for controlling the connection state thereof.

6. Apparatus for providing error correction according to claim 3, in which said means for producing data word and parity word addresses includes a read only memory means having stored therein predetermined parity word generator addresses and interleaving pattern addresses and being arranged to be enabled to output same to said data address selector means.

7. Apparatus for providing error correction according to claim 6, in which said means for producing data word and parity word addresses further includes work counter means receiving an external clock signal and counting the pulses therein for producing a word select signal fed to enable said read only memory means and fed to said address selector means.

8. Apparatus for providing error correction according to claim 7, in which said means for producing data word and parity word addresses further comprises block counter means to receive and count a carry signal produced by said word counter and producing a block counter signal based thereon.

9. Apparatus for providing error correction according to claim 8, in which said means for producing data word and parity word addresses further comprises a modulo adder means connected to receive said block count signal and said address signal from said read only memory means for adding same and producing a block address fed to said address selector means.

10. A method according to claim 1, further comprising the steps of generating a cyclic recirculating check code from said second interleave block and adding said cyclic recirculating check code to said second interleaved block and said second error correction redundant code before transmission thereof.

* * * * *